(12) United States Patent
Uchida

(10) Patent No.: US 11,801,716 B2
(45) Date of Patent: Oct. 31, 2023

(54) PNEUMATIC TIRE

(71) Applicant: The Yokohama Rubber Co., LTD., Tokyo (JP)

(72) Inventor: Yuta Uchida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 474 days.

(21) Appl. No.: 17/259,162

(22) PCT Filed: Jun. 19, 2019

(86) PCT No.: PCT/JP2019/024198
§ 371 (c)(1),
(2) Date: Jan. 9, 2021

(87) PCT Pub. No.: WO2020/012893
PCT Pub. Date: Jan. 16, 2020

(65) Prior Publication Data
US 2021/0162817 A1    Jun. 3, 2021

(30) Foreign Application Priority Data

Jul. 9, 2018 (JP) ................................ 2018-129848

(51) Int. Cl.
*B60C 11/12* (2006.01)
(52) U.S. Cl.
CPC ...... *B60C 11/1259* (2013.01); *B60C 11/1218* (2013.01); *B60C 11/1272* (2013.01);
(Continued)
(58) Field of Classification Search
CPC ......... B60C 11/1218; B60C 2011/1209; B60C 2011/1227
See application file for complete search history.

(56) References Cited

U.S. PATENT DOCUMENTS 4,566,514 A * 1/1986 Mauk .................... B60C 11/12
152/DIG. 3
11,584,165 B2 * 2/2023 Uchida .................. B60C 11/11
(Continued)

FOREIGN PATENT DOCUMENTS

EP      3738793 A1    11/2020
JP      H11-048721    2/1999
(Continued)

OTHER PUBLICATIONS

Machine translation for Japan 2013-095369 (Year: 2023).*
(Continued)

*Primary Examiner* — Steven D Maki
(74) *Attorney, Agent, or Firm* — Thorpe North & Western

(57) ABSTRACT

Each sipe wall surface of a sipe in a tread portion of a pneumatic tire includes, along a sipe depth direction, multiple ridge portions and at least one valley portion bending like waves. Where viewed along the sipe depth direction, a recess depth of the valley portion with respect to the ridge portion on one wall surface varies depending on a position in the extension direction, the valley portion extends from a position at which the recess depth is maximized toward a position at which the recess depth is minimized, and the recess depth decreases as the valley portion extends from the side of the maximum-depth valley portion toward the maximum ridge portion. The sipe is provided in at least one of a first half-tread region on a first side or a second half-tread region on a second side in a tire width direction.

16 Claims, 5 Drawing Sheets

(52) U.S. Cl.
CPC ............. *B60C 2011/1209* (2013.01); *B60C 2011/1213* (2013.01); *B60C 2011/1227* (2013.01)

(56) References Cited

U.S. PATENT DOCUMENTS

| | | | |
|---|---|---|---|
| 2002/0053383 | A1 | 5/2002 | Kleinhoff et al. |
| 2002/0170643 | A1* | 11/2002 | Kuze ............... B60C 11/12 152/209.5 |
| 2009/0283189 | A1 | 11/2009 | Mun |
| 2010/0307651 | A1 | 12/2010 | Castellini |
| 2013/0118663 | A1* | 5/2013 | Kishizoe ............ B60C 11/12 152/209.18 |
| 2014/0299245 | A1 | 10/2014 | Kaji |
| 2017/0113492 | A1 | 4/2017 | Kobayashi et al. |
| 2020/0338931 | A1 | 10/2020 | Uchida |

FOREIGN PATENT DOCUMENTS

| | | | |
|---|---|---|---|
| JP | 11-123910 A | * | 5/1999 |
| JP | H11-310012 | | 11/1999 |
| JP | 2006-044570 | | 2/2006 |
| JP | 2007-186053 | | 7/2007 |
| JP | 2011-105131 | | 6/2011 |
| JP | 2011-105135 | | 6/2011 |
| JP | 2013-095369 A | * | 5/2013 |
| JP | 2013-103579 | | 5/2013 |
| WO | WO 2015/190049 | | 12/2015 |

OTHER PUBLICATIONS

Machine translation for Japan 11-123910 (Year: 2023).*
International Search Report for International Application No. PCT/JP2019/024198 dated Sep. 10, 2019, 4 pages, Japan.

* cited by examiner

PNEUMATIC TIRE

TECHNICAL FIELD

The present technology relates to a pneumatic tire with sipes provided in a tread portion.

BACKGROUND ART

In general, in a pneumatic tire (hereinafter, also simply referred to as "tire"), a plurality of sipes extending in the tire width direction are provided in blocks of a tread portion to improve braking performance on wet road surfaces and icy road surfaces, based on an edge effect and a drainage effect produced by the sipes. However, the sipes reduce the rigidity of the blocks, and thus, while the tire is new, the blocks are subjected to collapse or shear deformation, leading to increased wear and a decrease in steering stability on dry road surfaces. Additionally, a configuration is known in which the sipes are shaped like waves in a sipe depth direction to suppress deformation of the blocks, while increasing the rigidity of the blocks. However, with the sipes in the wave-like shape, during vulcanization molding, removal of sipe blades provided in a mold is hindered, making the blocks likely to be damaged in a case where the sipe blades are removed from the tire. Such removal of the sipe blades from the tire is hereinafter referred to as mold releasing from the tire.

For example, a pneumatic tire is known that suppresses a decrease in the rigidity of the blocks and ribs caused by the sipes when the tire is new and that prevents the rigidity of the blocks and ribs from increasing excessively with progression of wear, the pneumatic tire allowing effective mitigation of degradation of mold releasing from the tire during vulcanization molding (see Japan Unexamined Patent Publication No. 2011-105131).

The pneumatic tire includes sipes in the blocks and/or ribs of the tread portion, and each of the sipes includes a bent portion provided at least at both end portions in a sipe length direction and including recesses and protrusions in a sipe width direction, the bent portion being provided along the sipe depth direction. In the sipe, the size of the recesses and protrusions of the bent portion gradually decreases toward a center side in the sipe length direction, and the bent portion on one end side in the sipe length direction and the bent portion on the other end side in the sipe length direction form recesses and protrusions in the opposite directions with respect to the side width direction.

In the sipe described above, the amplitude of the recesses and protrusions provided in the sipe depth direction gradually decreases from one end side to the other end side in the sipe length direction, and the amplitude of the recesses and protrusions is zero at the center portion between the one end side and the other end side in the sipe length direction. In the pneumatic tire described above, even in a case where opposing sipe wall surfaces start to collapse and approach each other, the collapse can be borne by the recesses and protrusions of the sipe wall surfaces, thus ensuring the rigidity of the sipe wall surfaces against collapse-deformation. On the other hand, the size of the recesses and protrusions of the bent portion of the sipe gradually decreases toward the center side in the sipe length direction, leading to easy removal of the sipe blades of the mold during vulcanization molding.

However, mold releasing from the pneumatic tire at the end of vulcanization molding is still insufficient. In a case where the amplitude of the recesses and protrusions of the bent portion is reduced in order to improve mold releasing from the tire, bearing the collapsing blocks or ribs, that is, bearing collapse of one of the sipe wall surfaces by the recesses and protrusions of the other sipe wall surface, is insufficient, and the rigidity of the sipe wall surfaces against the collapse-deformation does not improve.

Additionally, in a case where land portions provided with the sipes are subjected to deformation along the sipe length direction (this deformation is referred to as shear deformation), and the sipe wall surfaces start to be displaced by a different displacement amount, the rigidity of the land portions against shear deformation is still low because the sipe described above includes few recesses and protrusions formed along the sipe depth direction, the recesses and protrusions serving to inhibit the side wall surfaces from being displaced in the sipe length direction.

SUMMARY

The present technology provides a pneumatic tire including sipes having a sipe shape different from a known sipe shape, the sipes allowing improvement of mold releasing from the tire during tire manufacture, the sipes allowing the land portions with the sipes to be appropriately provided with the rigidity of the land portions against collapse-deformation and shear deformation.

An aspect of the present technology is a pneumatic tire including a tread portion provided with grooves and sipes. In the tread portion of the pneumatic tire, a shape of a tread pattern including a shape of land portions defined by the grooves and a shape of sipes is asymmetric, with respect to a tire equator line, between a first half-tread region on a first side in a tire width direction, for which a serial number is provided in a side portion of the pneumatic tire, and a second half-tread region on a second side opposite to the first side with respect to the tire equator line, and the sipes are provided in regions of the land portions located in at least one of the first half-tread region or the second half-tread region.

The sipes include first sipes, an opening of each of the first sipes viewed from a tread surface of the tread portion extends linearly between both ends of the sipe, in a sipe depth direction of the first sipe, side wall surfaces of the first sipe undulate like waves such that a maximum projection height and a maximum recess depth are equal with respect to a reference plane extending from the opening in the sipe depth direction, a first side wall surface corresponding to one of the side wall surfaces on both sides of the first sipe includes, along the sipe depth direction, at least two ridge portions and at least one valley portion sandwiched between the ridge portions bending like waves in a direction orthogonal to the sipe depth direction, at every different position in a sipe extension direction of the first sipe, and a second side wall surface corresponding to the other side wall surface includes, along the sipe depth direction, at least two valley portions located opposite the at least two ridge portions and at least one ridge portion located opposite the at least one valley portion, the ridge portions maintain a constant projection height with respect to the reference plane in the first side wall surface, at any positions in the sipe extension direction, and a recess depth of the valley portions from the ridge portions when viewed along the sipe depth direction varies depending on a position in the sipe extension direction, the ridge portions of the first side wall surface include a first ridge portion and a second ridge portion between which one of the valley portions is sandwiched in the sipe depth direction, and a spacing between the first ridge portion and the second ridge portion in the sipe depth direction increases toward one side in the sipe extension direction, and the recess depth, from the first ridge portion and the second ridge portion, of one of the valley portions sandwiched between the first ridge portion and the second ridge portion gradually increases toward the one side in the sipe extension direction.

Preferably, the grooves are disposed point-symmetrically or axisymmetrically between the first half-tread region and the second half-tread region, the first sipes are provided in each of the first half-tread region and the second half-tread region, and dimensions related to the ridge portions or the valley portions of the side wall surfaces of the first sipes located in the regions of the land portions corresponding to positions of point symmetry or axisymmetry in the first half-tread region and the second half-tread region are different from each other.

Preferably, one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth of the one of the valley portions is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes include sipes A, for which a product L2×L3 ranges from 0.3 to 8 mm² and a ratio L2/L1 ranges from 0.0042 to 0.066, and each of the sipes A is provided in a region of a lateral land portion located on an outer side, in the tire width direction, of an intermediate position at which a range between the tire equator line and a ground contact edge on an outer side of the first half-tread region in the tire width direction is divided in half.

Preferably, the first sipes include the sipes B, for which a product L2×L3 and a ratio L2/L1 for each of the sipes B are respectively smaller than the corresponding product L2×L3 and ratio L2/L1 for the sipes A, the product L2×L3 ranges from 0.05 to 2 mm², and the ratio L2/L1 ranges from 0.0014 to 0.033, and each of the sipes B is provided in a region of a lateral land portion located on an outer side, in the tire width direction, of an intermediate position at which a range between the tire equator line and a ground contact edge on an outer side of the second half-tread region in the tire width direction is divided in half.

Preferably, one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes include sipes A, for which a product L2×L3 ranges from 0.3 to 8 mm² and a ratio L2/L1 ranges from 0.0042 to 0.066, each of the sipes A is provided in a region of a lateral land portion located on an outer side, in the tire width direction, of an intermediate position at which a range between the tire equator line and a ground contact edge on an outer side of the first half-tread region in the tire width direction is divided in half, and a second sipe including two side wall surfaces opposing to each other and extending linearly in the sipe depth direction is provided in a region of a lateral land portion located on an outer side, in the tire width direction, of an intermediate position at which a range between the tire equator line and a ground contact edge on an outer side of the second half-tread region in the tire width direction is divided in half.

Additionally, preferably, one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes include sipes C, for which a product L2×L3 ranges from 0.3 to 10 mm² and a ratio L2/L1 ranges from 0.0042 to 0.066, and each of the sipes C is provided in a region of a lateral land portion located on an outer side, in the tire width direction, of an intermediate position at which a range between the tire equator line and a ground contact edge on an outer side of the second half-tread region in the tire width direction is divided in half.

Preferably, the first sipes include the sipes D, for which a product L2×L3 and a ratio L2/L1 for each of the sipes D are respectively smaller than the corresponding product L2×L3 and ratio L2/L1 for the sipes C, the product L2×L3 ranges from 0.05 to 3 mm², and the ratio L2/L1 ranges from 0.0014 to 0.033, and each of the sipes D is provided in a region of a lateral land portion located on an outer side, in the tire width direction, of an intermediate position at which a range between the tire equator line and a ground contact edge on an outer side of the first half-tread region in the tire width direction is divided in half.

Preferably, one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes include sipes C, for which a product L2×L3 ranges from 0.3 to 10 mm$^2$ and a ratio L2/L1 ranges from 0.0042 to 0.066, each of the sipes C is provided in a region of a lateral land portion located on an outer side, in the tire width direction, of an intermediate position at which a range between the tire equator line and a ground contact edge on an outer side of a second half-tread region in the tire width direction is divided in half, and a second sipe including two side wall surfaces opposed to each other and extending linearly in the sipe depth direction is provided in a region of a lateral land portion located on an outer side, in the tire width direction, of an intermediate position at which a range between the tire equator line and a ground contact edge on an outer side of the first half-tread region in the tire width direction is divided in half.

Preferably, a position of the one of the valley portions in the sipe depth direction viewed from the tread surface is identical at any position in the sipe extension direction.

Preferably, an extension direction of the first sipe viewed from the tread surface of the tread portion corresponds to an inclination angle of 45 degrees or smaller with respect to the tire width direction.

According to the pneumatic tire described above, mold releasing from the tire during tire manufacture can be improved, while the land portions with the sipes can be appropriately provided with the rigidity of the land portions against collapse-deformation and shear deformation.

DETAILED DESCRIPTION

Figure 1:
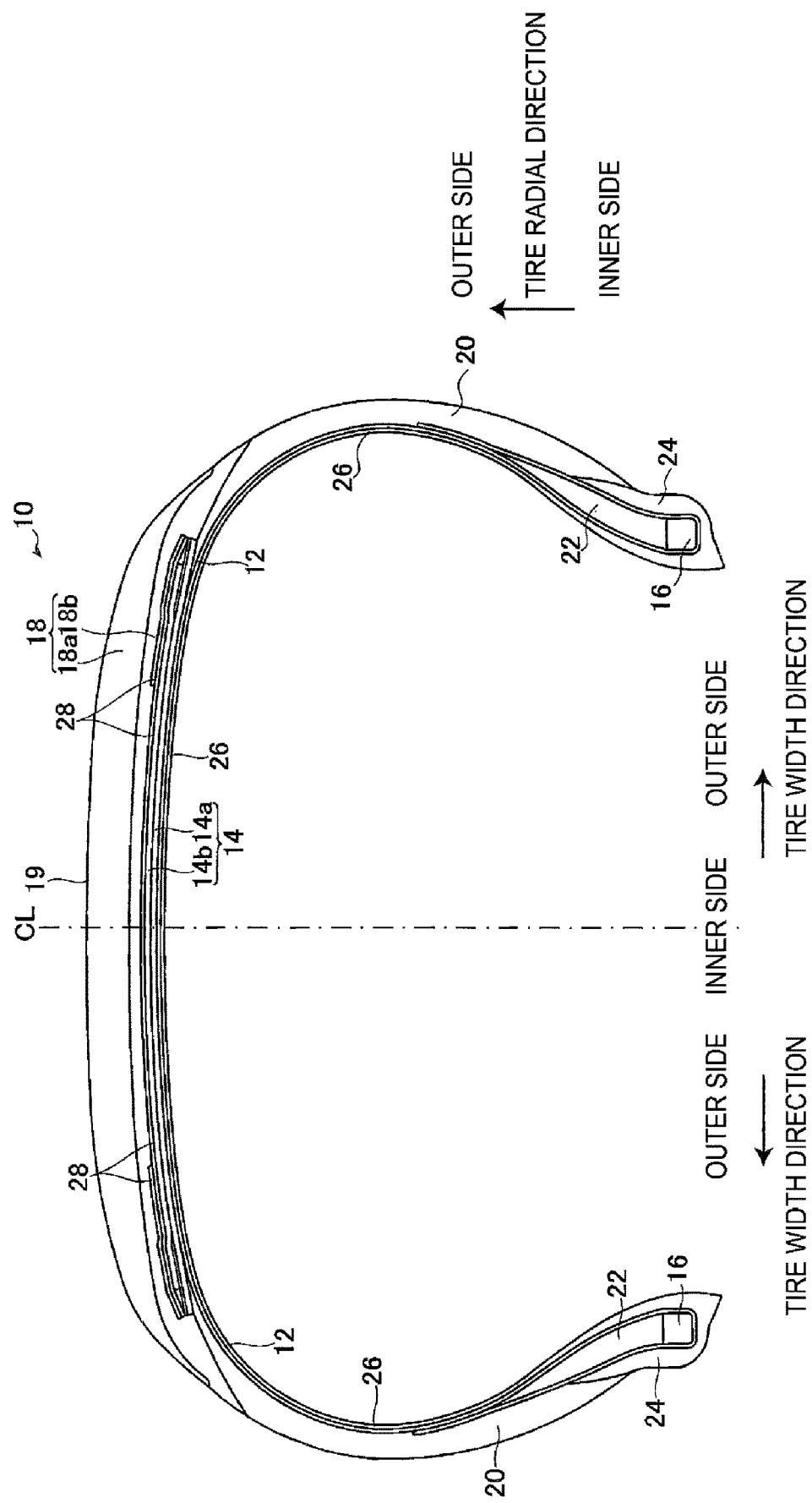
FIG. 1 is a tire cross-sectional view illustrating a cross-section of a pneumatic tire according to an embodiment.

Below, a pneumatic tire according to an embodiment will be described. The pneumatic tire described below is, for example, a tire for a passenger vehicle. The tire for a passenger vehicle refers to a tire specified in Chapter A of the JATMA Year Book 2010 (standards of The Japan Automobile Tyre Manufacturers Association, Inc.). The tire can also be a small truck tire specified in Chapter B or a truck tire or bus tire specified in Chapter C.

"Tire circumferential direction" described below refers to the direction (both rotation directions) to which a tread surface rotates in a case where a tire rotates about the tire rotation axis. "Tire radial direction" refers to the direction that extends radially orthogonal to the tire rotation axis. "Outer side in the tire radial direction" refers to the direction away from the tire rotation axis in the tire radial direction. "Tire width direction" refers to the direction parallel with the tire rotation axis direction. "Outer side in the tire width direction" refers to both directions away from a tire equator line of the tire.

Additionally, a ground contact edge of a pneumatic tire described below is an edge of a region in which the tread surface of a tread portion of the pneumatic tire contacts a dry horizontal surface, the edge being located farthest from the tire equator line in the tire width direction, in a case where the pneumatic tire is mounted on a regular rim, inflated to the regular internal pressure, and loaded with 70% of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

"Shape of a tread pattern described below being axisymmetric" refers to a tread pattern shape of a half-tread region on one side in the tire width direction with respect to the tire equator line overlapping a tread pattern shape of a half-tread region on the other side, in a case where the tire is turned inside out.

"Shape of the tread pattern being point symmetric" refers to the tread pattern shape of the half-tread region on one side in the tire width direction with respect to the tire equator line overlapping the tread pattern shape of the half-tread region on the other side, in a case where the tire is rotated through 180 degrees around one point on the tire equator line.

The tread pattern shape described below includes the shape of sipes, in addition to the shape of land portions defined by grooves. The shape of sipes includes the shape of the sipes visible on the tread surface, and in a case where a sipe wall surface includes recesses and protrusions in a sipe depth direction, the shape of the recesses and protrusions.

Figure 2:
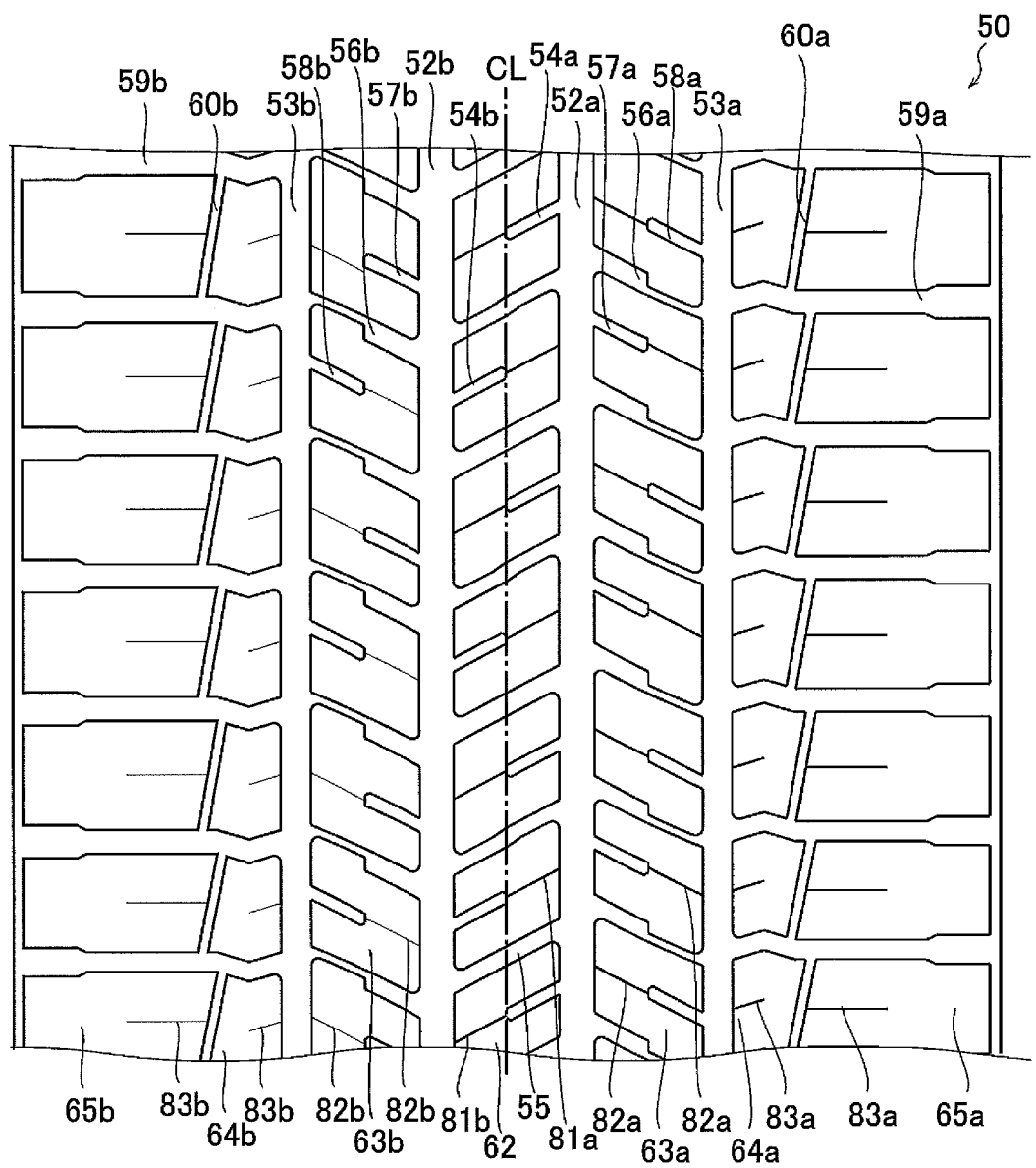
FIG. 2 is a diagram illustrating an example of a tread pattern provided in a tread portion of the pneumatic tire according to an embodiment.

FIG. 1 is a tire cross-sectional view illustrating a cross-section of a pneumatic tire 10 (hereinafter referred to as "tire 10") of an embodiment. FIG. 2 is a diagram illustrating an example of a tread pattern provided in a tread portion of the tire 10.

Tire Structure

The tire 10 includes, as illustrated in FIG. 1, a carcass ply layer 12, a belt layer 14, and bead cores 16 as framework members or layers of framework members and mainly includes a tread rubber member 18, side rubber members 20, bead filler rubber members 22, rim cushion rubber members 24, and an innerliner rubber member 26 around the framework members.

The carcass ply 12 includes a carcass ply member that is formed from organic fibers covered with rubber and that is wound into a toroidal shape, between a pair of the bead cores 16 of an annular shape. In the tire 10 illustrated in FIG. 1, the carcass ply layer 12 is made of a single carcass ply member but may be made of two carcass ply members. The belt layer 14 is provided on an outer side of the carcass ply layer 12 in the tire radial direction and is composed of two belt members 14a and 14b. The belt layer 14 is a member formed from steel cords covered with rubber, in which the steel cords are arranged inclined at a predetermined angle, for example, from 20 to 30 degrees, with respect to the tire circumferential direction. The width in the tire width direction of the belt member 14a, which is a lower layer, is greater than the width in the tire width direction of the belt member 14b, which is an upper layer. The steel cords of the two belt members 14a and 14b are inclined in opposite directions. Accordingly, the belt members 14a and 14b are crossing layers serving to suppress expansion of the carcass ply layer 12 due to inflation air pressure.

The tread rubber member 18 is disposed on an outer side of the belt layer 14 in the tire radial direction. Both end portions of the tread rubber member 18 connect to the side rubber members 20 to form the sidewall portions. The tread rubber member 18 is made of two layers of rubber members, namely an upper layer tread rubber member 18a provided on the outer side in the tire radial direction and a lower layer tread rubber member 18b provided on the inner side in the tire radial direction. The rim cushion rubber members 24 are respectively provided at the inner ends of the side rubber members 20 in the tire radial direction and come into contact with a rim on which the tire 10 is mountable. The bead filler rubber members 22 are provided on an outer side of the bead cores 16 in the tire radial direction, each of the bead filler rubber members 22 being sandwiched between a portion of the carcass ply layer 12 before being wound around the bead core 16 and a portion of the carcass ply layer 12 after being wound around the bead core 16. The innerliner rubber member 26 is provided in an inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has such a tire structure, but the tire structure is not limited to the tire structure illustrated in FIG. 1. In FIG. 1, the groove cross section of a tread pattern 50 described below that is formed in the tread rubber member 18 is omitted.

Tread Pattern

FIG. 2 illustrates an example of the tread pattern 50 provided in the tread portion. Grooves, land portions, and sipes are provided in the tread portion. The shape of the tread pattern 50 of the tread portion, the shape including the shape of the land portions defined by the grooves and the shape of the sipes, is asymmetric, with respect to the tire equator line CL, between a first half-tread region on a first side in the tire width direction, for which a serial number is provided in a side portion thereof, and a second half-tread region on a second side opposite the first side with respect to the tire equator line. "Asymmetric shape" refers to not being point symmetric or axisymmetric.

In the description of the tread pattern 50 illustrated in FIG. 2, the half-tread region on the right side of the page corresponds to the first half-tread region, and the half-tread region on the left side of the page corresponds to the second half-tread region. Here, "serial number" refers to a combination of a number allowing identification of the manufacturing year and week of the pneumatic tire 10 and a code symbol for a factory having manufactured the tire, the number and the code symbol being placed on the side portion thereof. The serial number is provided on one side in the tire width direction. The side of the side portion, on which the serial number is provided, faces the vehicle outer side in a case where the tire is mounted on a vehicle.

The shapes of the grooves and the land portions in the tread pattern 50 illustrated in FIG. 2 are point symmetric, but sipes 81a, 81b, 82a, 82b, 83a, 83b provided in the regions of the land portions described hereinafter are disposed asymmetrically between the first half-tread region and the second half-tread region.

The tread portion is provided with circumferential main grooves 52a, 52b, 53a, and 53b extending continuously and circumnavigating in the tire circumferential direction. Between the circumferential main groove 52a and the circumferential main groove 52b, lug grooves 55 are provided that connect the circumferential main groove 52a and the circumferential main groove 52b, and block land portions 62 are provided that are defined by the lug grooves 55 and the circumferential main groove 52a and the circumferential main groove 52b. Between the circumferential main groove 52a and the circumferential main groove 52b, lug grooves 54a and 54b are provided that extend from the circumferential main grooves 52a and 52b toward the side of the tire equator line CL and that terminate within a region of the block land portions 62 without reaching the other circumferential main groove 52b or 52a.

In addition, in the first half-tread region, lug grooves 56a are provided, each of which connects the circumferential main groove 52a and the circumferential main groove 53a, and in the second half-tread region, lug grooves 56b are provided, each of which connects the circumferential main groove 52b and circumferential main groove 53b. Between the circumferential main grooves 52a and the circumferential main grooves 53a in the first half-tread region, block land portions 63a are provided, each of which is defined by the lug grooves 56a, the circumferential main groove 52a, and the circumferential main groove 53a. Between the circumferential main grooves 52b and the circumferential main grooves 53b in the second half-tread region, block land portions 63b are provided, each of which is defined by the lug grooves 56b, the circumferential main groove 52b, and the circumferential main groove 53b. Furthermore, between the circumferential main groove 52a and the circumferential main groove 53a, lug grooves 57a and 58a are provided, each of which extends from one of the circumferential main grooves 52a or 53a toward an inner side of the corresponding block land portion 63a and terminates within the region of the block land portion 63a, without reaching the other circumferential main groove 53a or 52a. Additionally, between the circumferential main groove 52b and the circumferential main groove 53b, lug grooves 57b and 58b are provided, each of which extends from one of the circumferential main grooves 52b or 53b toward an inner side of the corresponding block land portion 63b and terminates within the region of the block land portion 63b, without reaching the other circumferential main groove 53b or 52b.

On the outer side of the circumferential main grooves 53a and 53b in the tire width direction, shoulder lug grooves 59a and 59b are provided, each of which extends from the circumferential main groove 53a or 53b toward the outer side in the tire width direction to a pattern end, and communication grooves 60a and 60b are provided, each of which connects the shoulder lug grooves 59a or the shoulder lug grooves 59b adjoining each other in the tire circumferential direction.

Additionally, on the outer side of the circumferential main grooves 53a and 53b in the tire width direction, lateral land portions 64a and 64b are provided, each of which is enclosed by the circumferential main groove 53a or 53b, the shoulder lug groove 59a or 59b, and the communication groove 60a or 60b. On the outer side of the lateral land portions 64a and 64b in the tire width direction, lateral land portions 65a and 65b are provided, each of which is defined by the shoulder lug groove 59a or 59b, the communication groove 60a or 60b, and the pattern end. The lateral land portions 64a, 64b, 65a, and 65b are each located on the outer side, in the tire width direction, of an intermediate position, at which a range between the tire equator line CL and a ground contact edge on an outer side of the first half-tread region or the second half-tread region in the tire width direction is divided in half.

Due to the plurality of grooves described above, the tread portion of the tire 10 includes the block land portions 62, 63a, and 63b and the lateral land portions 64a, 64b, 65a, and 65b. The sipes 81a, 81b, 82a, 82b, 83a, and 83b are provided in the respective regions of the land portions.

The tread pattern 50 of the tire 10 of an embodiment illustrated in FIG. 2 includes the above-described configuration, but the tread pattern is not limited to the configuration illustrated in FIG. 2.

In the tread pattern 50 illustrated in FIG. 2, the sipes are provided in the regions of blocks surrounded by the grooves or the ground contact edges in all directions, but the sipes may be provided in a region of a rib-like land portion that is continuous in the tire circumferential direction.

At least some of the sipes 81a, 81b, 82a, 82b, 83a, and 83b are provided with first sipes described below. All of the regions of the land portions are provided with the first sipes according to one embodiment, while some of the regions of the land portions are provided with the first sipes according to another embodiment. Hereinafter, the first sipes will be described collectively as a sipe 80.

Description of First Sipe

Figure 3A:
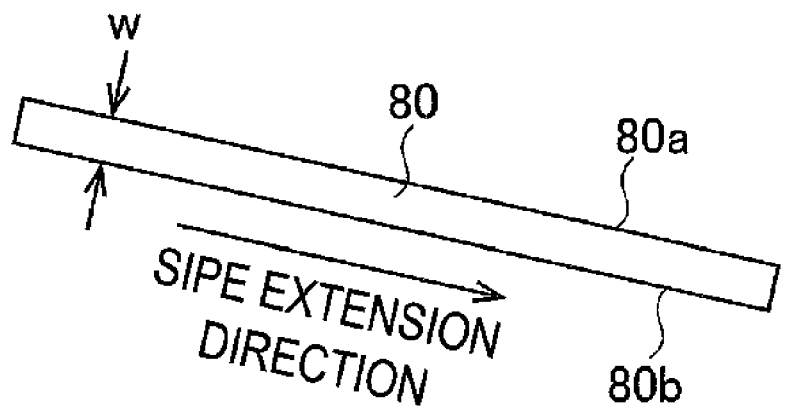
FIGS. 3A and 3B are each diagrams illustrating an example of sipes according to the pneumatic tire according to an embodiment.
Figure 3B:
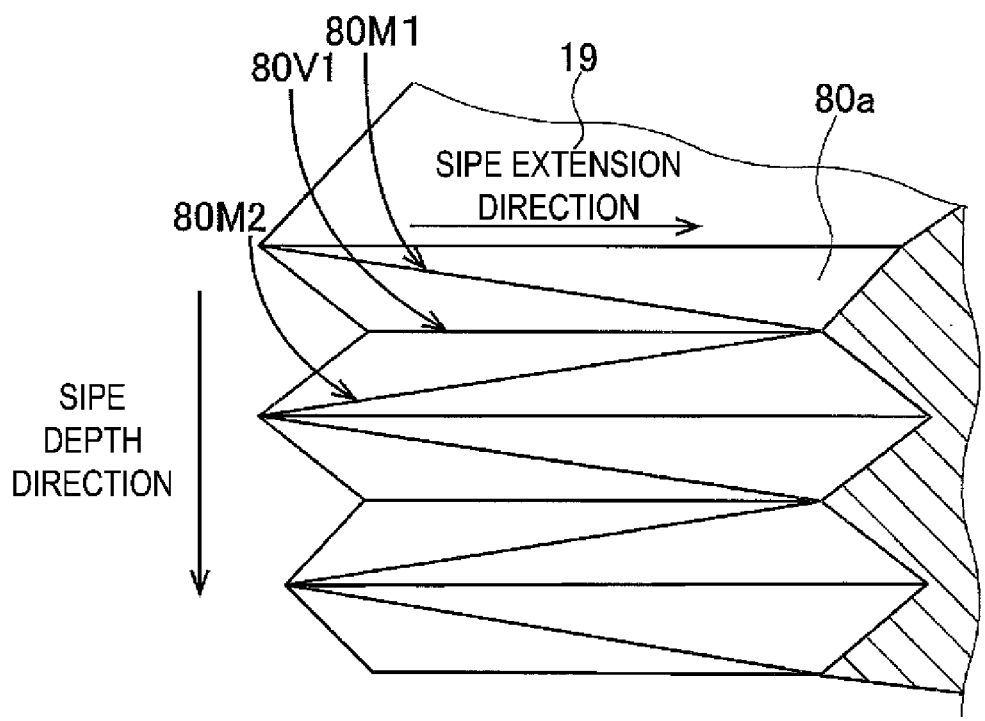

FIGS. 3A and 3B are diagrams illustrating an example of the sipe 80. FIG. 3A illustrates an opening of the sipe 80 in a tread surface 19. An opening viewed from the tread surface 19 extends linearly between both ends of the sipe. A width w of a sipe space, sandwiched by sipe wall surfaces (side wall surfaces) 80a and 80b that define the sipe 80 along a length direction (hereinafter, referred to as a sipe extension direction) of the opening of the sipe 80 that extends linearly, is for example, from 0.2 to 1.5 mm, and in a tire mold, sipe blades having a planar shape are mounted, as molds forming the sipes 80, on a mold tread forming surface provided with protrusion portions forming grooves in the tire mold.

Each sipe wall surface of a pair of the sipe wall surfaces 80a and 80b of the tread portion, defining the space of the sipe 80, includes, along the sipe depth direction, ridge portions and valley portions that bend or curve like waves, at every different position in the sipe extension direction. Specifically, the sipe wall surfaces 80a and 80b of the sipe 80 undulate like waves such that a maximum projection height and a maximum recessed depth are equal with respect to a reference plane. Specifically, the reference plane is a plane that extends in the sipe depth direction (the depth direction of the page of FIG. 3A) through the edge of the opening of the sipe 80, which corresponds to a portion of the sipe wall surface 80a or the sipe wall surface 80b.

FIG. 3B illustrates the recess/protrusion shape of the sipe wall surface 80a. The sipe wall surface 80b includes ridge portions and valley portions that bend or curve like waves in parallel with the sipe wall surface 80a at every different location and is separated from the side wall surface 80a by the constant width w. Accordingly, a sipe space with the constant width w is formed that is defined by the sipe wall surface 80a and the sipe wall surface 80b. In other words, the width w of the sipe 80 is constant in the sipe depth direction and in the sipe extension direction. Thus, a recess portion is provided at a position of the sipe wall surface 80b located opposite a protrusion portion on the sipe wall surfaces 80a, and a protrusion portion is provided at a position of the sipe wall surface 80b located opposite a recess portion in the sipe wall surfaces 80a.

The sipe wall surface 80a (first side wall surface) of the sipe 80 includes, in the sipe depth direction, at least two ridge portions and at least one valley portion bending and curving like waves in a direction orthogonal to the sipe depth direction, at every different position in the sipe extension direction.

On the other hand, although not illustrated in the diagrams, the sipe wall surface 80b includes: two valley portions located opposite two ridge portions of the sipe wall surface 80a; and at least one ridge portion located opposite at least one valley portion of the sipe wall surface 80a.

In the sipe wall surface 80a (first sipe wall surface), at any positions in the sipe extension direction, the ridge portions maintain a constant projection height with respect to the reference plane. Furthermore, in a case where the ridge portions and valley portions are viewed along the sipe depth direction, the recess depth of the valley portions from the ridge portions varies depending on the position in the sipe extension direction. The projection height at which the ridge portions maintain a constant height is, for example, a maximum projection height.

The example illustrated in FIG. 3B will be described in detail. The sipe wall surface 80a includes at least a first ridge portion 80M1, a second ridge portion 80M2, and a first valley portion 80V1. The first valley portion 80V1 is sandwiched between the first ridge portion 80M1 and the second ridge portion 80M2 in the sipe depth direction. The recess depth of the first valley portion 80V1 from the first ridge portion 80M1 and the second ridge portion 80M2 varies depending on the position in the sipe extension direction, and in the illustrated example, the recess depth decreases rightward in the diagram.

The first valley portion 80V1 extends from a side of a maximum-depth valley portion having a maximum recess depth (left side in the example illustrated in FIG. 3B) toward a position (right side in the example illustrated in FIG. 3B) at which the recess depth of the first valley portion 80V1 from the first ridge portion 80M1 and the second ridge portion 80M2 is minimized (the recess depth is zero in the example illustrated in FIG. 3B), and the recess depth from the first ridge portion 80M1 and the second ridge portion 80M2 gradually decreases, as the first valley portion 80V1 extends from the side of the maximum-depth valley portion toward a side of the maximum ridge portion. In other words, the first valley portion 80V1 extends from a position, where the recess depth of the first valley portion 80V1 from the first ridge portion 80M1 and the second ridge portion 80M2 is maximum, toward a position where the recess depth gradually decreases and is minimum. On the other hand, although not illustrated, the second side wall surface 80b includes: two valley portions located opposite the ridge portions of the first ridge portion 80M1 and the second ridge portion 80M2; and at least one ridge portion located opposite the first valley portion 80V1, and the ridge portions extend such that the projection height from the two valley portions gradually decreases from a position with the maximum projection height toward a position with the minimum projection height.

The spacing between the first ridge portion 80M1 and the second ridge portion 80M2 in the sipe depth direction increases toward one side in the sipe extension direction (left side of the page in the example illustrated in FIG. 3B), and the recess depth, from the first ridge portion 80M1 and the second ridge portion 80M2, of the first valley portion 80V1 sandwiched between the first ridge portion 80M1 and the second ridge portion 80M2 gradually increases toward the one side in the sipe extension direction.

As described above, the ridge portions and the valley portions are present at any positions in the sipe extension direction of the sipe 80, and thus, even in a case where the sipe 80 is subjected to an external force in a direction orthogonal to the sipe extension direction and subjected to collapse-deformation in which the sipe wall surfaces 80a and 80b approach each other, the recesses and protrusions of the sipe wall surfaces 80a and 80b engage with one another, at any positions in the sipe extension direction of the sipe 80, to bear the sipe wall surfaces 80a and 80b. This enables suppression of a decrease in the rigidity against collapse-deformation included in a decrease in the rigidity of the land portions of the tread portion, thanks to the sipes 80 provided in the land portions. In other words, the rigidity of the land portions with the sipes 80 against the collapse-deformation is improved compared to the rigidity, against the collapse-deformation of land portions with known sipes in which sipe wall surfaces defining the sipe include parallel flat surfaces. Furthermore, the recess depth decreases as the first valley portion 80V1 extends in the sipe extension direction, thus allowing mold releasing to be improved.

Furthermore, the spacing between the top portion of the first ridge portion 80M1 and the top portion of the second ridge portion 80M2 in the sipe depth direction varies in the sipe extension direction, and thus even in a case where, under an external force in the sipe extension direction, one of the sipe wall surfaces 80a and 80b starts to be displaced toward the other sipe wall surface by a relatively large displacement amount in the sipe extension direction, in other words, even in a case where the sipe wall surfaces 80a and 80b are subjected to shear deformation along the sipe extension direction and start to be displaced, the ridge portions and the valley portions of one of the sipe wall surfaces respectively located opposite the valley portions and the ridge portions of the other sipe wall surface bear the valley portions and the ridge portions of the other sipe wall surface and inhibit the deformation. This allows suppression of a decrease in the rigidity of the land portions with the sipes 80 against shear deformation along the sipe extension direction. That is, the rigidity of the land portions with the sipes 80 against the shear deformation along the sipe extension direction is improved compared to the rigidity, against the shear deformation along the sipe extension direction, of land portions with known sipes in which the sipe wall surfaces defining the sipe include parallel flat surfaces.

Figure 4:
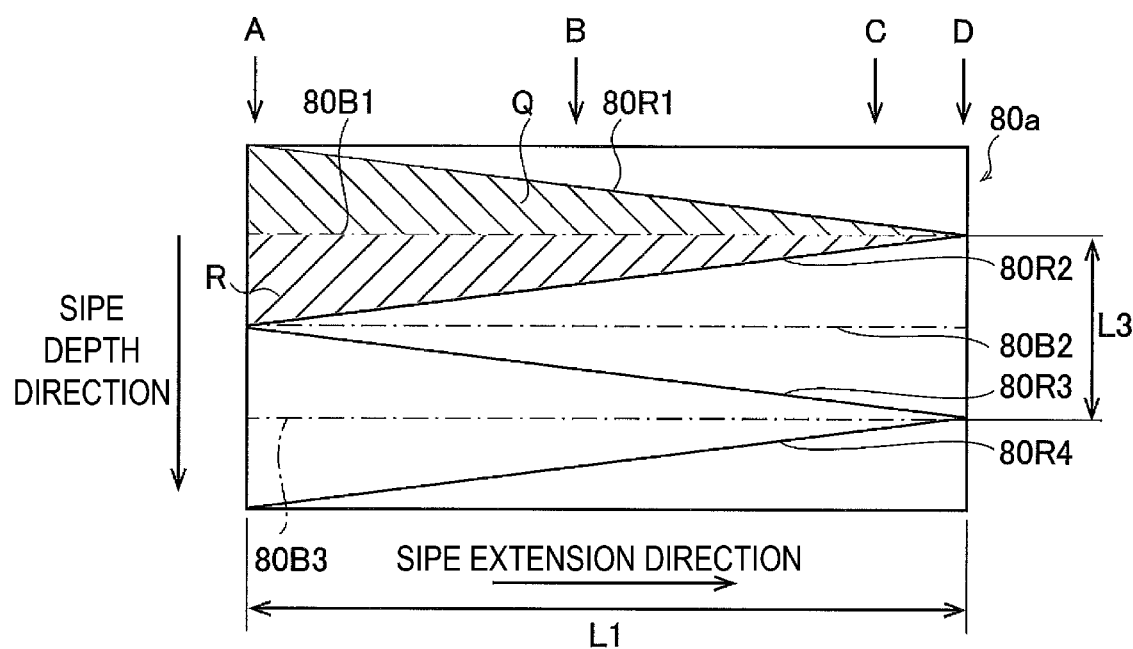
FIG. 4 is a diagram in a plan view of a sipe wall surface illustrated in FIG. 3B.
Figure 5:
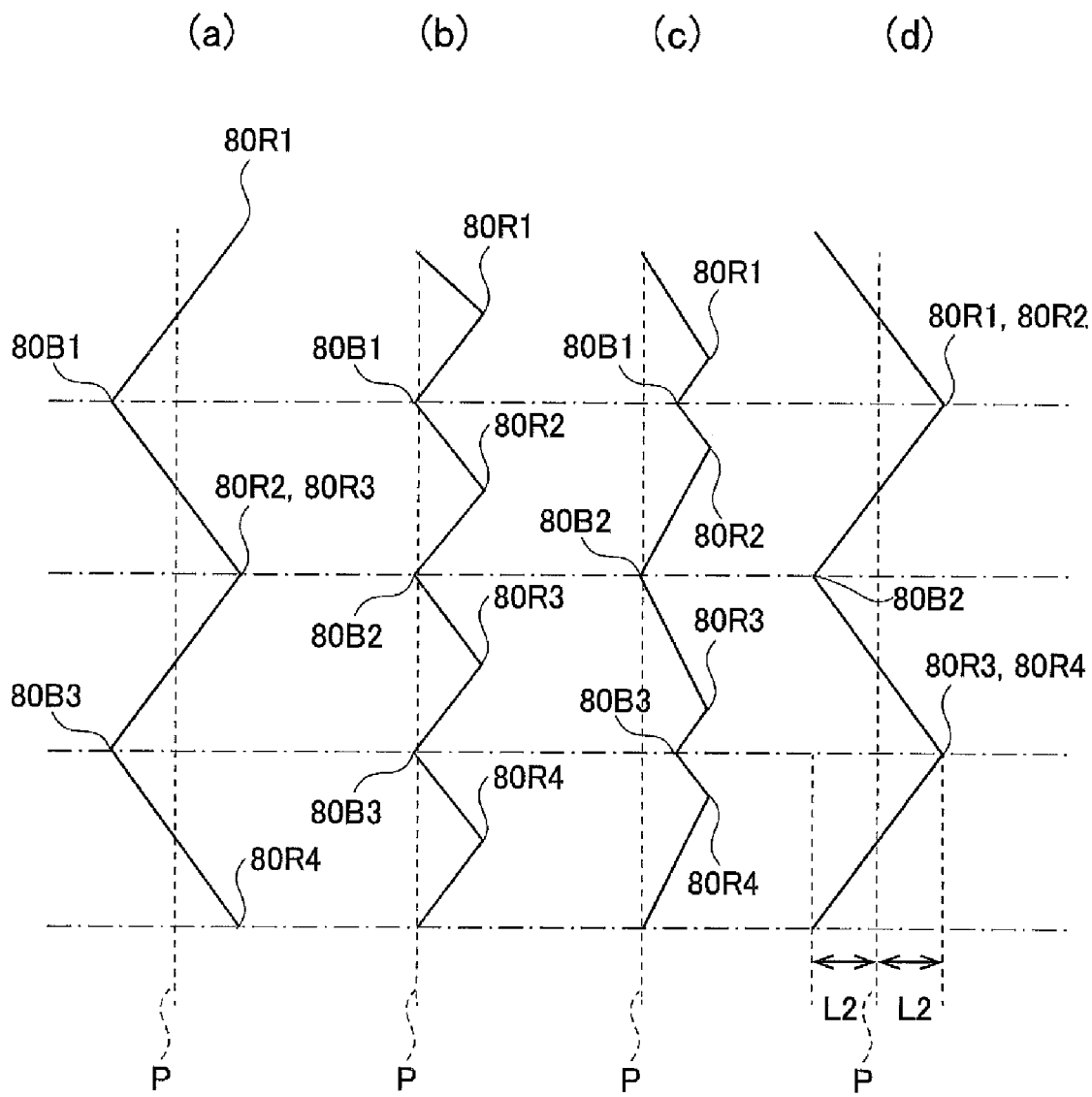
FIG. 5 at (a) to (d) is a diagram schematically illustrating an example of the shape of the sipe wall surface in a case where the sipe wall surface is cut at positions A to D in a sipe extension direction in FIG. 4.

FIG. 4 is a plan view of the sipe wall surface 80a illustrated in FIG. 3B. FIG. 5 at (a) to (d) is a diagram schematically illustrating an example of the shape of the sipe wall surface 80a in a case where the sipe wall surface 80a is cut at the positions A to D in the sipe extension direction in FIG. 4.

The ridge portion includes ridge lines 80R1, 80R2, 80R3, and 80R4. The ridge lines 80R1, 80R2, 80R3, and 80R4 correspond to, in the sipe wall surface 80a, top portions forming protrusion shapes from peripheral positions in the sipe depth direction at the same position in the sipe extension direction, the top portions extending continuously in the sipe extension direction. Additionally, the valley portion includes valley bottom lines 80B1, 80B2, and 80B3. The valley bottom lines 80B1, 80B2, and 80B3 correspond to bottom portions forming recess shapes from peripheral positions in the sipe depth direction at the same position in the sipe extension direction, the bottom portions extending continuously in the sipe extension direction. In FIG. 4, the ridge lines 80R1, 80R2, 80R3, and 80R4 are illustrated by solid lines, and the valley bottom lines 80B1, 80B2, and 80B3 are illustrated by dot-dash lines. Note that the ridge lines referred to herein are top lines in a case where the top portions of the ridge portions are lines, but that, in a case where the top portion forms flat surfaces each with a width, the ridge line may be a line formed by connecting the center positions of the flat surfaces.

Here, for the ridge lines 80R1, 80R2, 80R3, and 80R4, a position in the sipe depth direction varies in the sipe extension direction. The position of each of the ridge lines 80R1 and 80R3 shifts deeper in the sipe depth direction while extending rightward in FIG. 4, and the position of each of the ridge lines 80R2 and 80R4 shifts shallower in the sipe depth direction while extending rightward in FIG. 4.

Note that, although FIG. 4 illustrates the ridge lines and the valley bottom lines of the sipe wall surface 80a, the sipe wall surface 80b includes: valley bottom lines located opposite the ridge lines 80R1, 80R2, 80R3, and 80R4 of the sipe wall surface 80a; and ridge lines located opposite the valley bottom lines 80B1, 80B2 and 80B3, and thus in the sipe wall surface 80b, the position of each valley bottom line in the sipe depth direction shifts while the valley bottom line extends in the sipe extension direction.

Additionally, as illustrated in FIG. 4, the valley bottom line 80B1 of the sipe wall surface 80a is parallel to the tread surface 19. At this time, an inclined surface Q sandwiched between the valley bottom line 80B1 and the ridge line 80R1 and an inclined surface R sandwiched between the valley bottom line 80B1 and the ridge line 80R2 are configured to face the corresponding inclined surfaces of the sipe wall surface 80b.

The varying position of the ridge line or the valley bottom line in the sipe depth direction allows the shape of the ridge portion or the valley portion to be varied depending on the position in the sipe extension direction. Accordingly, in a case where the sipe blades are removed from the tread rubber, the sipe blades are less susceptible to resistance of the tread rubber, allowing the sipe blades to be easily removed. Thus, mold releasing from the tire can be improved.

Additionally, since the inclined surface Q sandwiched between the valley bottom line 80B1 and the ridge line 80R1 and the inclined surface R sandwiched between the valley bottom line 80B1 and the ridge line 80R2 are configured to face the corresponding inclined surfaces of the sipe wall surface 80b, even in a case where the shear deformation of the land portions along the sipe extension direction starts to displace the ridge portion of one of the sipe wall surfaces in the sipe extension direction, the inclined surface between the ridge portion and the valley portion (inclined surfaces R and Q) comes into contact with the inclined surface of the other sipe wall surface to inhibit the displacement of the ridge portion. Thus, the rigidity of the land portions with the sipes 80 against shear resistance is improved compared to the rigidity, against the shear deformation of land portions with known sipes in which the sipe wall surfaces defining the sipe include parallel flat surfaces.

According to an embodiment, preferably, the ridge line 80R1 and the ridge line 80R2, or the ridge line 80R2 and the ridge line 80R3, or the ridge line 80R3 and the ridge line 80R4 approach each other while extending toward one side in the sipe extension direction, and as illustrated in FIG. 4, the ridge lines join up with each other. At this time, the recess depth from the ridge line 80R1 and ridge line 80R2 at the valley bottom line 80B1 becomes progressively shallower toward the converging position, and the recess depth of the valley bottom line 80B1 is preferably zero at the confluence position. Thus, with mold releasing from the tire improved, the rigidity of the land portions with the sipes against collapse-deformation and shear deformation can be improved compared to the rigidity of the land portions with the known sipes against collapse-deformation and shear deformation.

FIG. 5 at (a) to (d) illustrates the recess/protrusion shapes at the positions A to D illustrated in FIG. 4 to facilitate understanding of the shapes of the sipe wall surfaces. As illustrated in FIG. 5 at (a) to (d), the positions the ridge line 80R1, the ridge line 80R2, the ridge line 80R3, and the ridge line 80R4 in the sipe depth direction varies depending on the position in the sipe extension direction. In a case where the sipe blades are removed from the tread rubber, the resistance experienced by the sipe blades varies according to the magnitude of the amount of variation in the recess/protrusion shape in the sipe depth direction and decreases consistently as the amount of variation decreases. Since the recess depth of each of the valley bottom lines 80B1, 80B2, and 80B3 gradually decreases from the maximum recess depth, the amounts of variation in the recess/protrusion shape at the positions B and C are smaller than the amounts of variation in the recess/protrusion shape at the positions A and D. Thus, the resistance experienced by the sipe blade at the positions B and C is small, allowing mold releasing from the tire to be improved. On the other hand, the number of the recesses and protrusions in the recess/protrusion shape along the sipe depth direction is greater at the positions B and C than at the positions A and D, as illustrated in FIG. 5 at (b) and (c). Thus, in a case of collapsing, the sipe wall surfaces more effectively engage with and bear each other.

Additionally, for the ridge line 80R1, the ridge line 80R2, the ridge line 80R3, and the ridge line 80R4, since the position in the sipe depth direction varies, with the projection height with respect to a reference plane P maintained, and since the inclined surfaces of the ridge portions 80M1 and 80M2 forming each of the ridge line 80R1, the ridge line 80R2, the ridge line 80R3, and the ridge line 80R4 come into contact with and are borne by the inclined surfaces of the valley portions of the opposing sipe wall surface 80b, thus even in a case where the sipe wall surfaces are subjected to shear deformation with the displacement amount differing between the sipe wall surfaces, the sipe wall surfaces are more effectively inhibited from being displaced.

As illustrated in FIG. 4, the valley bottom line 80B2 is provided at a deeper location in the sipe depth direction than the valley bottom line 80B1 and provided parallel to the valley bottom line 80B1, and the valley bottom line 80B2 joins up with the ridge 80R2 and the ridge line 80R3. A confluence position where the valley bottom line 80B2 joins up with the ridge 80R2 and the ridge line 80R3 is different from a confluence position where the valley bottom line 80B1 joins up with the ridge line 80R1 and the ridge line 80R2. In the example illustrated in FIG. 4, the confluence position where the valley bottom line 80B2 joins up with the ridge line 80R2 and the ridge line 80R3 is located opposite, in the sipe extension direction, to the confluence position where the valley bottom line 80B1 joins up with the ridge line 80R1 and the ridge line 80R2. Such a shape allows the valley bottom lines to be repeatedly provided in the sipe depth direction, and thus the rigidity of the land portions with the sipes 80 against collapse-deformation and the shear deformation is significantly improved compared to the rigidity of the land portions with the known sipes in which the sipe wall surfaces defining the sipe include parallel flat surfaces.

A distance L1 (see FIG. 4) along the sipe extension direction from the position A where the recess depth of the valley bottom line 80B illustrated in FIG. 4 from the ridge line 80R1 and the ridge line 80R2 is maximized to the position D where the recess depth is minimized (zero) is, for example, from 10 to 40 mm.

A dimension L2 (see FIG. 5) of each of the maximum recessed depth and the maximum protrusion of the sipe wall surfaces 80a and 80b is, for example, from 0.1 to 5 mm and is preferably from 0.3 to 2 mm.

Additionally, a separation distance L3 (see FIG. 4) between the ridge portions 80M1 and 80M2 adjacent in the sipe depth direction at a position where the valley portion 80V1 or the valley bottom line 80B1 is at the maximum recess depth is, for example, from 0.5 to 8 mm and is preferably from 1 to 4 mm.

Here, in addition to the collapse-deformation of land portions such as blocks or ribs provided with the sipes 80, the rigidity against shear deformation varies depending on the shapes of the ridge portions including the ridge portions 80M1 and 80M2 and the valley portions including the valley portion 80V1. For example, the rigidity of the land portions against collapse-deformation and shear deformation is preferably adjusted by adjusting a ratio L2/L1 of the dimension L2 (see FIG. 5) to the distance L1 (see FIG. 4) and a product L2×L3 of the dimension L2 and the separation distance L3.

The ratio L2/L1 indicates the magnitude of the inclination angle at which two ridge lines adjacent in the sipe depth direction illustrated in FIG. 4 approach each other in the sipe extension direction, and the product L2×L3 indicates the magnitude of the projected area of the inclined surface Q and the inclined surface R illustrated in FIG. 4 as viewed parallel to the sipe extension direction. Increasing the ratio L2/L1 and the product L2×L3 enables an increase in the rigidity of the land portions against shear deformation. Additionally, increasing the dimension L2 enables an increase in the rigidity of the land portions against collapse-deformation. Thus, for the increased rigidity of the land portions against shear deformation and collapse-deformation, the dimension L2 is preferably improved. However, with an excessively increased dimension L2, in a case where an attempt is made to remove the tire from the tire mold during a vulcanization step, the sipe blades are subjected to high resistance of the tread rubber, making separation of the tire from the mold difficult. Thus, using sipes with a large dimension L2 all over the tread pattern is difficult, and locally using is preferable. In this case, by adjusting the ratio L2/L1 and the product L2×L3 with the dimension L2 limited to within a predetermined range, the rigidity against collapse-deformation and the rigidity against shear deformation can be variably adjusted.

For example, by reducing the distance L1 and increasing the separation distance L3, with the dimension L2 unchanged, the ratio L2/L1 and the product L2×L3 can be improved to enhance the rigidity against shear deformation. In addition, by increasing the dimension L2 within a predetermined range, with the ratio L2/L1 and the product L2×L3 unchanged, the rigidity against collapse-deformation can be improved.

For the tread pattern 50 illustrated in FIG. 2, the tire 10 is mounted such that the vehicle outer side corresponds to the side of the first half-tread region where a serial number is provided on the side portion thereof (the right side of the page in the example illustrated in FIG. 2), the first half-tread region being located on one of both sides in the tire width direction. Thus, the first half-tread region faces the vehicle outer side in a case where the tire 10 is mounted on the vehicle. Thus, the first half-tread region is a portion in which the tire is subjected to a large lateral force from the ground during cornering of the vehicle. Accordingly, increasing the rigidity of the land portions against the lateral force of the first half-tread region is preferable in terms of improved dry steering stability (steering performance at a large steering angle). In particular, it is preferable to increase the rigidity against the lateral force of the lateral land portions 64a and 65a, corresponding to land portions located away from the tire equator line CL on the outer side in the tire width direction.

In this case, for the sipes 83a in which the sipe extension direction (the extension direction of the opening of the sipe viewed from the tread surface of the tread portion) corresponds to an inclination direction at 45 degrees or smaller with respect to the tire width direction, the ratio L2/L1 and the product L2×L3 are preferably adjusted to improve the rigidity against shear deformation, as illustrated in FIG. 2.

Additionally, some vehicles on which the tire 10 is mounted may have a large negative camber. The tire 10 mounted on such a vehicle has an increased ground contact surface on the vehicle inner side which is increased by a large negative camber, and high-speed durability on the side of the second half-tread region is likely to decrease. Accordingly, the rigidity of the land portions in the second half-tread region in the tire circumferential direction and the tire width direction is preferably increased. In particular, it is preferable to increase the rigidity against the force exerted in the tire circumferential direction and the tire width direction in the lateral land portions 64b and 65b, corresponding to land portions located away from the tire equator line CL on the outer side in the tire width direction. In this case, as illustrated in FIG. 2, for the sipes 83b in which the sipe extension direction corresponds to an inclination direction at 45 degrees or smaller with respect to the tire width direction, the ratio L2/L1 and the product L2×L3 are preferably adjusted to improve the rigidity against: the collapse-deformation in which the sipe wall surfaces 80a and 80b start to collapse due to a force exerted in the tire circumferential direction; and the shear deformation along the sipe extension direction experienced by the land portions due to a lateral force.

Hereinafter, a tire having improved dry steering stability; and sipes suitable for a tire having improved load durability will be described.

(1) Tire with Improved Dry Steering Stability

In order to obtain a tire with improved dry steering stability, it is preferable to improve the rigidity of the lateral land portions 64a and 65a against the lateral force in the tire width direction. In case of using sipes in which the sipe extension direction corresponds to a direction at 45 degrees or smaller with respect to the tire width direction, the above-described rigidity against shear deformation is preferably improved. In this case, the sipes 83a provided in the regions of the lateral land portions 64a and 65a are preferably sipes A for which the product L2×L3 ranges from 0.3 to 8 mm$^2$ and for which the ratio L2/L1 ranges from 0.0042 to 0.066. By providing the sipes A in the region of the lateral land portions 64a and 65a, dry steering stability can be improved. According to an embodiment, the sipes A need not be provided in all of the regions of the lateral land portions 64a and 65a illustrated in FIG. 2, but may be provided in some of the regions. Additionally, according to an embodiment, the sipes A may also be provided in the regions of the block land portions 62 and 63a of the first half-tread region. For the tire for a passenger vehicle, the distance L1 ranges from 30 to 70 mm, for example, the dimension L2 ranges from 0.3 to 2 mm, for example, and the separation distance L3 ranges from 1 to 4 mm, for example.

In this case, according to an embodiment, the sipes 83b provided in the regions of the lateral land portions 64b and 65b of the second half-tread region are preferably sipes B for which the product L2×L3 ranges from 0.05 to 2 mm$^2$ and for which the ratio L2/L1 ranges from 0.0014 to 0.033. Both the product L2×L3 and the ratio L2/L1 for the sipes B are smaller than the corresponding product L2×L3 and ratio L2/L1 for the sipes A. By providing the sipes B as described above in the regions of the lateral land portions 64b and 65b, braking performance and high-speed durability on wet road surfaces are also improved. The width w, which is the distance between the sipe wall surfaces of the sipe B, is preferably similar to the width w of the sipe A. The sipes B need not be provided in all of the regions of the lateral land portions 64b and 65b illustrated in FIG. 2, but may be provided in some of the regions. Additionally, according to an embodiment, the sipes B may be provided in the regions of the block land portions 62 and 63b located in the second half-tread region. For the tire for a passenger vehicle, the distance L1 ranges from 30 to 70 mm, for example, the dimension L2 ranges from 0.1 to 1 mm, for example, and the separation distance L3 ranges from 0.5 to 2 mm In addition, according to an embodiment, in the regions of the lateral land portions 64b and 65b of the second half-tread region, instead of the sipes 83b, known sipes (second sipes) are preferably provided in which the two opposing sipe wall surfaces are parallel and in which the sipe wall surfaces form flat surfaces extending linearly in the sipe depth direction. In this case, the width of the sipe, corresponding to the distance between the sipe wall surfaces, is preferably similar to the width w of the sipe 80 provided in the regions of the lateral land portions 64a and 65a of the first half-tread region. In this case as well, dry steering stability is improved.

(2) Tire with Improved High-Speed Durability

The high-speed durability means up to which level of speed the tire can have the durability to be maintained without being destroyed in a case where, with the negative camber taken into account, the rotation speed of the tire is gradually increased under a certain load at a camber angle similar to that of the negative camber. Preferably, such a tire improves the rigidity of the lateral land portions 64b and 65b of the second half-tread region against the force in tire width direction and the tire circumferential direction. In this case, the sipes 83b provided in the regions of the lateral land portions 64b and 65b are preferably sipes C for which the product L2×L3 ranges from 0.3 to 10 mm$^2$ and for which the ratio L2/L1 ranges from 0.0042 to 0.066. By providing the sipes C in the regions of the lateral land portions 64b and 65b, high-speed durability can be improved. The sipes C need not be provided in all of the regions of the lateral land portions 64b and 65b illustrated in FIG. 2, but may be provided in some of the regions. For the tire for a passenger vehicle, the distance L1 ranges from 30 to 70 mm, for example, the dimension L2 ranges from 0.3 to 2 mm, for example, and the separation distance L3 ranges from 1 to 5 mm, for example.

In this case, according to an embodiment, the sipes 83a provided in the regions of the lateral land portions 64a and 65a of the first half-tread region are preferably sipes D for which the product L2×L3 ranges from 0.05 to 3 mm² and for which the ratio L2/L1 ranges from 0.0014 to 0.033. Both the product L2×L3 and the ratio L2/L1 for the sipes D are smaller than the corresponding product L2×L3 and ratio L2/L1 for the sipes C. By providing the sipes D as described above in the regions of the lateral land portions 64a and 65a, braking performance on wet road surfaces and dry steering stability are also improved. The width w, corresponding to the distance between the sipe wall surfaces of the sipe D, is preferably similar to the width w of the sipe C. The sipes D need not be provided in all of the regions of the lateral land portions 64a and 65a illustrated in FIG. 2, but may be provided in some of the regions. Additionally, according to an embodiment, the sipes D may be provided in the regions of the block land portions 62 and 63a of the first half-tread region. For the tire for a passenger vehicle, the distance L1 ranges from 30 to 70 mm, for example, the dimension L2 ranges from 0.1 to 1 mm, for example, and the separation distance L3 ranges from 0.5 to 3 mm.

In addition, according to an embodiment, in the regions of the lateral land portions 64b and 65b of the first half-tread region, instead of the sipes 83a, known sipes (second sipes) are preferably provided in which the two opposing sipe wall surfaces are parallel and in which the sipe wall surfaces form flat surfaces extending linearly in the sipe depth direction. In this case, the width of the sipe, corresponding to the distance between the sipe wall surfaces, is preferably similar to the width w of the sipe 80 provided in the regions of the lateral land portions 64a and 65a of the first half-tread region. In this case as well, high-speed durability is improved.

In the tread pattern 50 illustrated in FIG. 2, the shape of the grooves and land portions is point symmetric, but according to another embodiment, the shape of the grooves and land portions can be made axisymmetric with respect to the tire equator line CL. For the axisymmetric shape, the tire rotation direction is often specified. The tire rotation direction is designated by a symbol, characters, or the like displayed on the sidewall. In such a case, to locate the first half-tread region on the vehicle outer side with respect to the second half-tread region, it is preferable that the sidewall located on the vehicle mounting outer side displays a symbol, characters, or the like indicating that the sidewall faces the vehicle mounting outer side or includes a serial number. Even in a case where the shape of the grooves and the land portions is point symmetric or axisymmetric, the tread pattern can be formed into an asymmetric shape by providing sipes such that the type of the sipes provided in the regions of the land portions (including differences in the dimensions of the distance L1, the dimension L2, and the separation distance L3) differs between the first half-tread region and the second half-tread region.

In other words, according to an embodiment, the grooves in the tread pattern are disposed point-symmetrically or axisymmetrically between the first half-tread region and the second half-tread region, and for the sipes provided in the regions of the land portions of the tread pattern, the forms of the recess/protrusion shapes of the sipe wall surfaces (dimensions of the distance L1, the dimension L2, and the separation distance L3) located in the regions of the land portions corresponding to the positions of point symmetry or axisymmetry in the first and second half-tread regions can be made different from each other.

Of course, in the regions of the land portions of a tread pattern in which the grooves and the land portions have an asymmetric shape that is not point-symmetric or axisymmetric, the sipes are provided such that the type of the sipes provided in the regions of the land portions differs between the first half-tread region and the second half-tread region, allowing a tread pattern in an asymmetric shape to be formed.

EXAMPLES, CONVENTIONAL EXAMPLE

To verify the effects of the present embodiment, for sipes of the tread pattern 50 illustrated in FIG. 2, the sipes 80 having various dimensions and being provided in the land portions of the first half-tread region and the second half-tread region are provided in the tire 10, and the tire 10 (195/65R 15 91H) with the tire structure illustrated in FIG. 1 is manufactured and tested for dry steering stability performance and the high-speed durability.

For dry steering stability performance, four of the tires 10 are mounted on rims (rim size 15×6.0 J) and further mounted on a test vehicle (1500 cc, front wheel drive passenger vehicle) at an air pressure of 200 kPa, and the test vehicle is driven on a dry road surface on a predetermined course and evaluated by sensory evaluation by a driver. The evaluation results for each example are indexed, with the following Conventional Example assigned the value of 100. Higher indexes indicate more excellent dry steering stability performance.

For high-speed durability, the tires are driven on a drum testing machine at a load of 5.31 kN and an air pressure of 220 kPa, using a rim 15×6.0 J. The tires are evaluated for performance by performing the testing until the tires are broken. In the testing, with a period before the start of driving defined as step 0, the tires are driven at a constant running speed for 30 minutes in sequential steps from step 1. After the elapse of 30 minutes, the step is incremented by one, and driving at the constant running speed for 30 minutes is repeated. The running speed in step 1 is 121 km/hr, the running speed in step 2 is 129 km/hr, the running speed in step 3 is 137 km/hr, and so forth, and the running speed is increased by 8 km/hr on a step-by-step basis. High-speed durability is evaluated based on a step in which the tire is broken, and how high the step is has been checked by using, as a reference (zero), the corresponding step in Conventional Example described below. Thus, larger values indicate more excellent high-speed durability.

Tables 1 and 2 indicate specifications and evaluation results.

Unlike the form of the sipes 80 illustrated in FIG. 3B, the form of the sipes in Conventional Example is such that three ridge portions extend parallel to the tread surface at the same position in the sipe depth direction and have a constant projection height and is such that the valley portions sandwiched between the ridge portions extend parallel to the tread surface, at the same position in the sipe depth direction and have a constant recess depth. The dimension of the sipe corresponding to the dimension L2 of the sipe 80 is 0.7 mm, the separation distance between the adjacent ridge portions in the sipe depth direction is 1.0 mm, and the dimensions are indicated in the corresponding sections in Table 1. The sipe is provided in all of the land portions in the first half-tread region and the second half-tread region.

In Examples, the sipes 81a, 81b, 82a, 82b in the tread pattern 50 and the sipes 83a and 83b in the lateral land portions 64a and 64b are in the same form as that in Conventional Example described above, and the sipes 80 with varying dimensions are used as all of the sipes provided in the regions of the lateral land portions 65a and 65b.

In the sipes provided in the regions of the lateral land portions 64b and 65b in Example 3, the two opposing sipe wall surfaces are parallel, and the sipe wall surfaces form flat surfaces extending linearly in the sipe depth direction. In the sipes provided in the regions of the lateral land portions 64a and 65a in Example 6, the two opposing sipe wall surfaces are parallel, and the sipe wall surfaces form flat surfaces extending linearly in the sipe depth direction, the sipes being known sipes.

TABLE 1

|  |  | Conventional Example | Example 1 | Example 2 | Example 3 |
|---|---|---|---|---|---|
| Sipe in region of lateral land portion 65a | Distance L1 (mm) | — | 40.0 | 40.0 | 40.0 |
|  | Dimension L2 (mm) | 0.7 | 0.7 | 0.7 | 0.7 |
|  | Separation distance L3 (mm) | 1.0 | 1.0 | 1.0 | 1.0 |
|  | L2 × L3 (mm$^2$) | 0.7 | 0.7 | 0.7 | 0.7 |
|  | L2/L1 | — | 0.018 | 0.018 | 0.018 |
| Sipe in region of lateral land portion 65b | Distance L1 (mm) | — | 40.0 | 40.0 | — |
|  | Dimension L2 (mm) | 0.7 | 0.2 | 0.5 | — |
|  | Separation distance L3 (mm) | 1.0 | 0.2 | 1.0 | — |
|  | L2 × L3 mm$^2$ | 0.7 | 0.04 | 0.5 | — |
|  | L2/L1 | — | 0.005 | 0.013 | — |
| Dry Steering Stability |  | 100 | 102 | 103 | 102 |
| High-speed durability |  | 0 | +1 | +2 | +1 |

TABLE 2

|  |  | Example 4 | Example 5 | Example 6 |
|---|---|---|---|---|
| Sipe in region of lateral land portion 65a | Distance L1 (mm) | 40.0 | 40.0 | — |
|  | Dimension L2 (mm) | 0.2 | 0.5 | — |
|  | Separation distance L3 (mm) | 0.2 | 1.0 | — |
|  | L2 × L3 (mm$^2$) | 0.04 | 0.50 | — |
|  | L2/L1 | 0.005 | 0.013 | — |
| Sipe in region of lateral land portion 65b | Distance L1 (mm) | 40.0 | 40.0 | 40.0 |
|  | Dimension L2 (mm) | 0.7 | 0.7 | 0.7 |
|  | Separation distance L3 (mm) | 1.0 | 1.0 | 1.0 |
|  | L2 × L3 mm$^2$ | 0.7 | 0.7 | 0.7 |
|  | L2/L1 | 0.018 | 0.018 | 0.018 |
| Dry Steering Stability |  | 101 | 102 | 101 |
| High-speed durability |  | +2 | +3 | +2 |

The table indicates that all of Examples 1 to 6 improve both dry steering stability and high-speed durability compared to Conventional Example. This indicates that the land portions with the sipes 80 can be appropriately provided with the rigidity of the land portions against collapse-deformation and shear deformation.

A comparison between Example 1 and Example 2 indicates that, for the sipes provided in the regions of the lateral land portions of the second half-tread region, not only the dry steering stability but also the high-speed durability can be improved by using the sipes for which the product L2×L3 ranges from 0.05 to 2 mm$^2$ and for which the ratio L2/L1 ranges from 0.0014 to 0.033, the product L2×L3 and the ratio L2/L1 being smaller than the corresponding product L2×L3 and ratio L2/L1 of the sipes provided in the regions of the lateral land portions of the first half-tread region. Additionally, as illustrated in Example 3, compared to the Conventional Example, a configuration, in which the identical sipes having flat surfaces as those in Conventional Example are provided in the regions of the lateral land portions of the second half-tread region, can improve not only the dry steering stability but also the high-speed durability.

A comparison between Example 4 and Example 5 indicates that, for the sipes provided in the regions of the lateral land portions of the first half-tread region, not only high-speed durability but also the dry steering stability can be improved by using the sipes for which the product L2×L3 ranges from 0.05 to 2 mm$^2$ and for which the ratio L2/L1 ranges from 0.0014 to 0.033, the product L2×L3 and the ratio L2/L1 being smaller than the corresponding product L2×L3 and ratio L2/L1 of the sipes provided in the regions of the lateral land portions of the second half-tread region. Additionally, as illustrated in Example 6, compared to the Conventional Example, a configuration, in which the identical sipes having flat surfaces as those in Conventional Example are provided in the regions of the lateral land portions of the first half tread region, can improve not only the dry steering stability but also the high-speed durability.

The foregoing has been a detailed description of the pneumatic tire according to embodiments of the present technology. However, the present technology is naturally not limited to the above embodiments and Examples and may be improved or modified in various ways within the scope of the present technology.

The invention claimed is:

1. A pneumatic tire comprising a tread portion provided with grooves and sipes,
   a shape of a tread pattern of the tread portion, the shape comprising a shape of land portions defined by the grooves and a shape of sipes, being asymmetric, with respect to a tire equator line, between a first half-tread region on a first side in a tire width direction, for which a serial number is provided in a side portion of the pneumatic tire, and a second half-tread region on a second side opposite to the first side with respect to the tire equator line,
   the sipes being provided in regions of the land portions located in at least one of the first half-tread region or the second half-tread region,
   the sipes comprising first sipes,
   an opening of each of the first sipes viewed from a tread surface of the tread portion extending linearly between both ends of the sipe,
   in a sipe depth direction of the first sipe, side wall surfaces of the first sipe undulating like waves such that a maximum projection height and a maximum recess depth are equal with respect to a reference plane extending from the opening in the sipe depth direction,
   a first side wall surface corresponding to one of the side wall surfaces on both sides of the first sipe comprising, along the sipe depth direction, at least two ridge portions and at least one valley portion sandwiched between the ridge portions bending like waves in a direction orthogonal to the sipe depth direction, at every different position in a sipe extension direction of the first sipe, and a second side wall surface corresponding to the other side wall surface comprising, along the sipe depth direction, at least two valley portions located opposite the at least two ridge portions and at least one ridge portion located opposite the at least one valley portion, the ridge portions maintaining a constant projection height with respect to the reference plane in the first side wall surface, at any positions in the sipe extension direction, and a recess depth of the valley portions from the ridge portions when viewed along the sipe depth direction varying depending on a position in the sipe extension direction, the ridge portions of the first side wall surface comprising a first ridge portion and a second ridge portion between which one of the valley portions is sandwiched in the sipe depth direction, and a spacing between the first ridge portion and the second ridge portion in the sipe depth direction increasing toward one side in the sipe extension direction, and the recess depth, from the first ridge portion and the second ridge portion, of one of the valley portions sandwiched between the first ridge portion and the second ridge portion gradually increasing toward the one side in the sipe extension direction.

2. The pneumatic tire according to claim 1, wherein
the grooves are disposed point-symmetrically or axisymmetrically between the first half-tread region and the second half-tread region,
the first sipes are provided in each of the first half-tread region and the second half-tread region, and
dimensions related to the ridge portions or the valley portions of the side wall surfaces of the first sipes located in the regions of the land portions corresponding to positions of point symmetry or the axisymmetry in the first half-tread region and the second half-tread region are different from each other.

3. The pneumatic tire according to claim 2, wherein
one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth of the one of the valley portions is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes comprise sipes A, for which a product L2×L3 ranges from 0.3 to 8 mm$^2$ and a ratio L2/L1 ranges from 0.0042 to 0.066, and each of the sipes A is provided in a region of a lateral land portion located on an outer side, in the tire width direction, of an intermediate position at which a range between the tire equator line and a ground contact edge on an outer side of the first half-tread region in the tire width direction is divided in half.

4. The pneumatic tire according to claim 3, wherein
the first sipes comprise sipes B,
the first sipes comprise the sipes B, for which a product L2×L3 and a ratio L2/L1 for each of the sipes B are respectively smaller than the corresponding product L2×L3 and ratio L2/L1 for the sipe A, the product L2×L3 ranges from 0.05 to 2 mm$^2$, and the ratio L2/L1 ranges from 0.0014 to 0.033, and each of the sipes B is provided in a region of a lateral land portion located on an outer side, in the tire width direction, of an intermediate position at which a range between the tire equator line and a ground contact edge on an outer side of the second half-tread region in the tire width direction is divided in half.

5. The pneumatic tire according to claim 2, wherein
one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes comprise sipes C, for which a product L2×L3 ranges from 0.3 to 10 mm$^2$ and a ratio L2/L1 ranges from 0.0042 to 0.066, and each of the sipes C is provided in a region of a lateral land portion located on an outer side, in the tire width direction, of an intermediate position at which a range between the tire equator line and a ground contact edge on an outer side of the second half-tread region in the tire width direction is divided in half.

6. The pneumatic tire according to claim 5, wherein
the first sipes comprise sipes D,
the first sipes comprise the sipes D, for which a product L2×L3 and a ratio L2/L1 for each of the sipes D are respectively smaller than the corresponding product L2×L3 and ratio L2/L1 for the sipe C, the product L2×L3 ranges from 0.05 to 3 mm$^2$, and the ratio L2/L1 ranges from 0.0014 to 0.033, and each of the sipes D is provided in a region of a lateral land portion located on an outer side, in the tire width direction, of an intermediate position at which a range between the tire equator line and a ground contact edge on an outer side of the first half-tread region in the tire width direction is divided in half.

7. The pneumatic tire according to claim 1, wherein
one of the valley portions sandwiched between the first ridge portion and the second ridge portion extends from a position of the maximum recess depth toward a position at which the recess depth of the valley portion from the ridge portion is minimized, the recess depth decreasing gradually, when a distance along the sipe extension direction from the position where the recess depth of the one of the valley portions is maximized to the position where the recess depth of the one of the valley portions is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes comprise sipes A, for which a product L2×L3 ranges from 0.3 to 8 mm$^2$ and a ratio L2/L1 ranges from 0.0042 to 0.066, and each of the sipes A is provided in a region of a lateral land portion located on an outer side, in the tire width direction, of an intermediate position at which a range between the tire equator line and a ground contact edge on an outer side of the first half-tread region in the tire width direction is divided in half.

8. The pneumatic tire according to claim 7, wherein
the first sipes comprise sipes B,
the first sipes comprise the sipes B, for which a product L2×L3 and a ratio L2/L1 for each of the sipes B are respectively smaller than the corresponding product L2×L3 and ratio L2/L1 for the sipe A, the product L2×L3 ranges from 0.05 to 2 mm$^2$, and the ratio L2/L1 ranges from 0.0014 to 0.033, and
each of the sipes B is provided in a region of a lateral land portion located on an outer side, in the tire width direction, of an intermediate position at which a range between the tire equator line and a ground contact edge on an outer side of the second half-tread region in the tire width direction is divided in half.

9. The pneumatic tire according to claim 1, wherein
one of the valley portions sandwiched between the first ridge portion and the second ridge portion extends from a position of the maximum recess depth toward a position at which the recess depth of the valley portion from the ridge portion is minimized, the recess depth decreasing gradually,
when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3,
the first sipes comprise sipes A, for which a product L2×L3 ranges from 0.3 to 8 mm$^2$ and a ratio L2/L1 ranges from 0.0042 to 0.066,
each of the sipes A is provided in a region of a lateral land portion located on an outer side, in the tire width direction, of an intermediate position at which a range between the tire equator line and a ground contact edge on an outer side of the first half-tread region in the tire width direction is divided in half, and
a second sipe comprising two side wall surfaces opposing to each other and extending linearly in the sipe depth direction is provided in a region of a lateral land portion located on an outer side, in the tire width direction, of an intermediate position at which a range between the tire equator line and a ground contact edge on an outer side of the second half-tread region in the tire width direction is divided in half.

10. The pneumatic tire according to claim 1, wherein
one of the valley portions sandwiched between the first ridge portion and the second ridge portion extends from a position of the maximum recess depth toward a position at which the recess depth of the valley portion from the ridge portion is minimized, the recess depth decreasing gradually,
when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3, the first sipes comprise sipes C, for which a product L2×L3 ranges from 0.3 to 10 mm$^2$ and a ratio L2/L1 ranges from 0.0042 to 0.066, and
each of the sipes C is provided in a region of a lateral land portion located on an outer side, in the tire width direction, of an intermediate position at which a range between the tire equator line and a ground contact edge on an outer side of the second half-tread region in the tire width direction is divided in half.

11. The pneumatic tire according to claim 10, wherein
the first sipes comprise sipes D,
the first sipes comprise the sipes D, for which a product L2×L3 and a ratio L2/L1 for each of the sipes D are respectively smaller than the corresponding product L2×L3 and ratio L2/L1 for the sipe C, the product L2×L3 ranges from 0.05 to 3 mm$^2$, and the ratio L2/L1 ranges from 0.0014 to 0.033, and
each of the sipes D is provided in a region of a lateral land portion located on an outer side, in the tire width direction, of an intermediate position at which a range between the tire equator line and a ground contact edge on an outer side of the first half-tread region in the tire width direction is divided in half.

12. The pneumatic tire according to claim 1, wherein
one of the valley portions sandwiched between the first ridge portion and the second ridge portion extends from a position of the maximum recess depth toward a position at which the recess depth of the valley portion from the ridge portion is minimized, the recess depth decreasing gradually,
when a distance along the sipe extension direction from the position where the recess depth of the one of the valley portions is maximized to the position where the recess depth is minimized is L1, a dimension of the maximum projection height or the maximum recess depth is L2, and a separation distance along the sipe depth direction between the first ridge portion and the second ridge portion at the position of the maximum recess depth in the sipe extension direction is L3,
the first sipes comprise sipes C, for which a product L2×L3 ranges from 0.3 to 10 mm$^2$ and a ratio L2/L1 ranges from 0.0042 to 0.066,
each of the sipes C is provided in a region of a lateral land portion located on an outer side, in the tire width direction, of an intermediate position at which a range between the tire equator line and a ground contact edge on an outer side of a second half-tread region in the tire width direction is divided in half, and
a second sipe comprising two side wall surfaces opposed to each other and extending linearly in the sipe depth direction is provided in a region of a lateral land portion located on an outer side, in the tire width direction, of an intermediate position at which a range between the tire equator line and a ground contact edge on an outer side of the first half-tread region in the tire width direction is divided in half.

13. The pneumatic tire according to claim 12, wherein
a position of the one of the valley portions in the sipe depth direction viewed from the tread surface is identical at any position in the sipe extension direction.

14. The pneumatic tire according to claim 13, wherein
an extension direction of the first sipe viewed from the tread surface of the tread portion corresponds to an inclination angle of 45 degrees or smaller with respect to the tire width direction.

15. The pneumatic tire according to claim 1, wherein
a position of the one of the valley portions in the sipe depth direction viewed from the tread surface is identical at any position in the sipe extension direction.

16. The pneumatic tire according to claim 1, wherein
an extension direction of the first sipe viewed from the tread surface of the tread portion corresponds to an inclination angle of 45 degrees or smaller with respect to the tire width direction.

* * * * *